Patented Dec. 20, 1927.

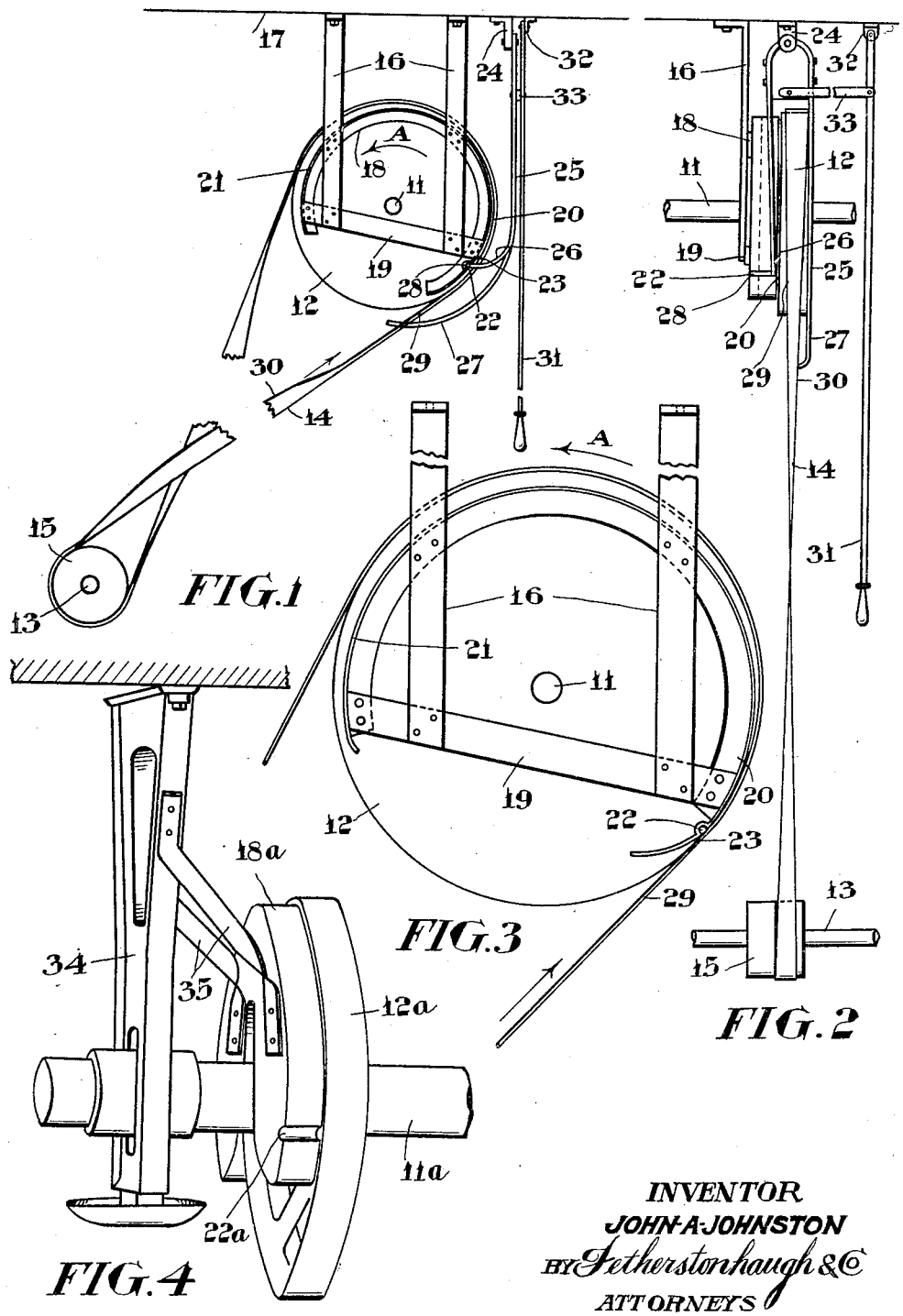

1,653,463

UNITED STATES PATENT OFFICE.

JOHN A. JOHNSTON, OF WESTMOUNT, QUEBEC, CANADA.

BELT-SHIFTING MECHANISM.

Application filed December 9, 1924. Serial No. 754,822.

This invention relates to new and useful improvements in belt shifting mechanism and is particularly adaptable to machines where the belt is shifted or moved from a live or driving pulley on to a stationary holder to stop said machines.

The object of the invention is to provide a belt shifting mechanism of simple construction which will be easily erected and efficient in operation.

Another object is to provide a belt holder which will have a braking action on a driven machine.

A further object is to provide a belt shifting mechanism which will slacken the belt when shifted on to the belt holder. A further object is to provide a belt holder so designed that no bevelled surfaces will be necessary to lead the belt from its slack position on to the driving pulley.

In my invention I provide a stationary belt holder which is erected in close proximity to a driving pulley. The periphery of the holder is made in the form of a differential curve, part of which co-incides with the periphery of the pulley, said part being so positioned, when created, that it lies in line with the face of the pulley, and at a point where the driving belt forms a tangent with the pulley on its driving side. The remaining portion of the periphery of the holder is of a slightly less curvature than the pulley so that the belt, when thrown on to said holder, will slacken to reduce the strain on the belt. A groove is formed in the face of the holder and means are provided which slide in the slot for throwing the belt from the holder on to the driving pulley. Also attached to the last mentioned means is an arm for throwing the belt to the holder or inoperative position.

In the drawings:

Figure 1 is a side elevation of a main shaft driving mechanism showing my improved belt shifting mechanism.

Figure 2 is a front elevation of the device shown in Figure 1.

Figure 3 is an enlarged side elevation of the belt holder shown in Figure 1.

Figure 4 is a perspective view of one modification of my invention.

Referring more particularly to the drawings, and in particular to Figures 1, 2 and 3, 11 designates a main line driving shaft which may be rotated in the direction indicated by arrow A from a source not shown. Secured to the shaft is the driving pulley 12 which is adapted to rotate the shaft 13 through the medium of the belt 14 and pulleys 15 in the usual manner. In the drawing I have shown a cross belt drive for illustrative purposes only. Supported on strap brackets 16, which may be secured by any suitable means to the ceiling or roof structure 17, is the belt holder designated as a whole by the numeral 18. The belt holder is mounted in close proximity to the driving pulley and may be formed of structural shapes. The structural shapes are slightly longer than the length of the belt in contact with the driving pulley and are bent in the form of a differential curve, one part 20 of which is adapted to coincide with the curvature of the driving pulley, said part being located at approximately the point where the driving side of the belt lies at a tangent to periphery of the driving pulley. The remaining parts 21 of the structural shapes are curved to gradually reduced radii so that the holder is slightly less in diameter than the driving pulley. A groove 22 is formed in the part 20 and across the face thereof, said grooves being positioned at a point 23 where the belt, when stretched between the holder and the pulley 15, will form a tangent with the curved part 20. Pivotally attached to the bracket 24 secured to the roof structure, is the forked lever 25, the arms 26 and 27 of which are positioned one in each side edge of said belt. The arm 26 is shorter than the arm 27 and is bent in such a manner that its end 28 fits into the groove 22 and engages with the side 29 of the belt remote from the driving pulley when the belt is in engagement with the holder. The arm 27 extends below the driving pulley and is adapted to engage with the edge 30 of the belt to throw it on to the belt holder. Motion is transmitted to the forked lever by means of the hand lever 31 which is pivotally secured to the bracket 32 attached to the roof structure, said hand lever being connected to the forked lever by means of the link 33. In the modification shown in Figure 4, the holder 18ª is made in one piece with its periphery of the same contour as that shown in Figures 1 and 3. This holder is attached to the shaft hanger 34 by means of the twisted bar supports 35. The holder is mounted in close proximity to the driving pulley 12ª secured to the main line or driving shaft 11ª which is supported in the hanger. The groove 22ª is formed in the holder in the same location as the groove 22 in Figure 1. Other modifications may be made in the construction of the device without departing from the spirit of the invention.

In operation the belt is moved from the driving pulley on to the holder by means of the forked lever, the arm 27 of which exerts a pressure on the edge of the belt and is moved by the hand lever. In throwing the belt from the holder on to the driving pulley, pressure is exerted on the forked lever by means of the hand lever, and the arm 26 exerts a pressure on the belt at a point where the belt forms a tangent with the driving pulley or periphery of the holder, and the rotation of the driving pulley draws the belt on to the face of the pulley. As will be seen, the end 26 exerts a steady pressure at the first point of contact of the belt and driving pulley, thereby ensuring the maximum engagement of said belt with the said pulley. It will be readily seen that the structure of the device is of the simplest construction and is very easily erected in position. The belt when thrown on to the holders acts as a brake against further rotation of the driven machine, and leaves the belt slack to relieve the tension thereof.

Having thus described my invention, what I claim is:—

1. The combination with a driving pulley and a belt therefor of a belt shifting mechanism including a belt holder presenting a curved surface having a portion thereof substantially flush with a portion of the belt receiving surface of the pulley, there being a transverse groove formed in said curved surface in line with the first point of contact of the belt with the pulley, a pivotally mounted shifting lever presenting integral arms spaced apart to receive the belt therebetween and alternately engageable therewith to shift the belt to or from the pulley dependent upon the direction in which the lever is moved, one of said arms being bent to provide a finger slidably disposed in said groove.

2. A belt shifting mechanism adapted to be associated with a drive pulley and its belt, said mechanism comprising a belt holder presenting a curved surface arranged with a portion thereof substantially flush with a portion of the belt receiving surface of the pulley, there being a transverse groove formed in said curved surface in line with the first point of contact of the belt with the pulley, a shifting lever pivoted at a point above said holder and presenting integral arms of unequal length spaced apart to receive the belt therebetween, the shorter arm of the lever being bent to provide a finger slidably disposed in said groove and being adapted to engage one side of the belt to shift the belt from the holder on to the pulley, the longer arm of said lever being engageable with the opposite side of the belt to shift the latter from the pulley on to the holder, a pivotally mounted handle lever, and a connection between said handle member and the shifting lever whereby the latter is swingable in either direction to shift the belt to or from the pulley.

In witness whereof, I have hereunto set my hand.

JOHN A. JOHNSTON.